C. HARTZELL.
WATER-ELEVATOR AND PURIFIER.
No. 181,336. Patented Aug. 22, 1876.
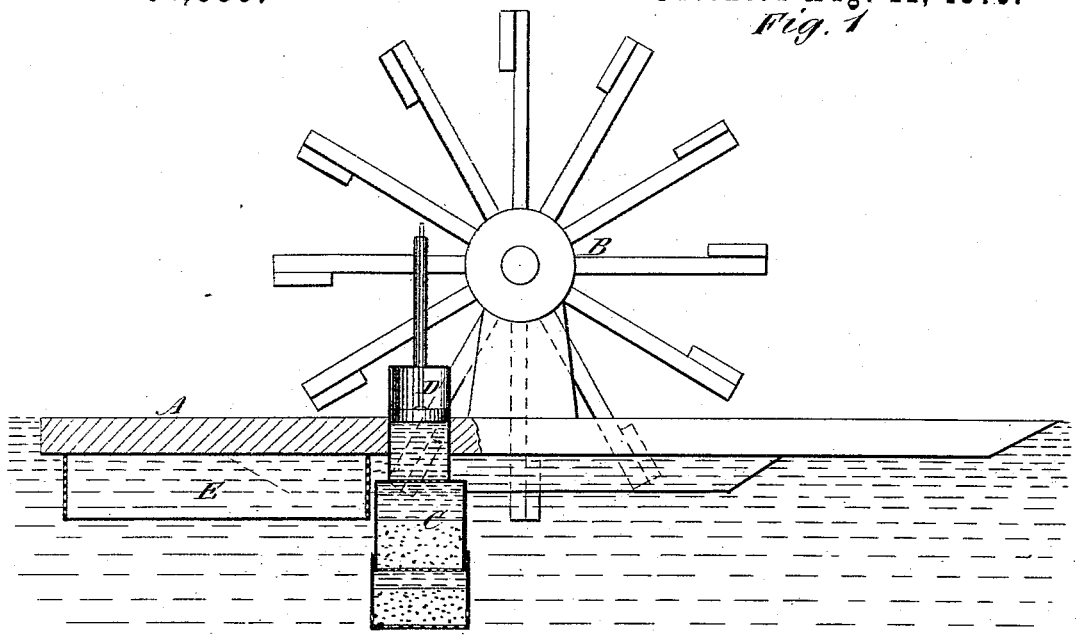
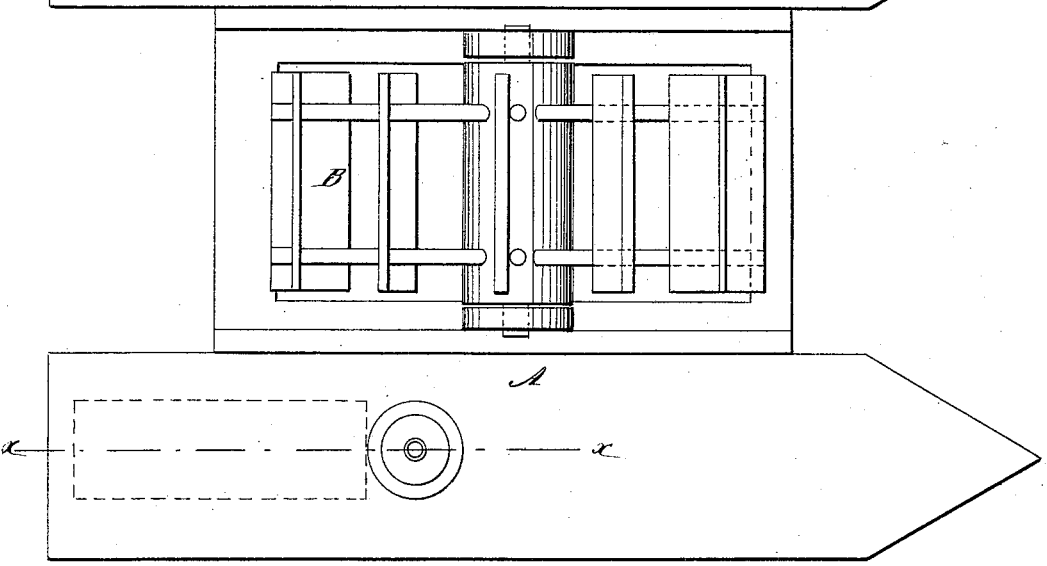
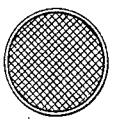
WITNESSES:
C. Neveux
John Goethals
INVENTOR:
C. Hartzell
BY
[signature]
ATTORNEYS.

UNITED STATES PATENT OFFICE.

CONRAD HARTZELL, OF ST. JOSEPH, MISSOURI.

IMPROVEMENT IN WATER ELEVATORS AND PURIFIERS.

Specification forming part of Letters Patent No. 181,336, dated August 22, 1876; application filed June 20, 1876.

*To all whom it may concern:*

Be it known that I, CONRAD HARTZELL, of St. Joseph, in the county of Buchanan and State of Missouri, have invented a new and Improved Water Elevator and Purifier, of which the following is a specification:

The invention will first be described in connection with the drawing, and then pointed out in the claim.

Figure 1 is a longitudinal sectional elevation of my improved contrivance taken on the line $x\,x$, of Fig. 2. Fig. 2 is a plan view, and Fig. 3 is a plan view of a section, of the filter.

Similar letters of reference indicate corresponding parts.

A represents a float of any approved kind; B, a paddle-wheel mounted on it so as to be turned by the current of the water; C, the filter mounted on the float, and adapted for the application of a pump—say, by having a piston fitted to work in the cylinder D to raise water through the filter, and discharge it in any approved receptacle, thus filtering it at the same time. The pump will, of course, be geared to the wheel in any approved way.

If desired, the capacity of the filter may be extended to any required limit by arranging the filter as represented at E—that is, by fixing one or more horizontal tubes along the bottom of the float, as shown, which may either be connected to filter C or be substituted for it, and have the pump attached to it.

Having thus described my invention, I claim as new and desire to secure by Letters Patent—

A tube attached to ship, boat, or float so as to be submerged, and provided with a filter at the bottom, as shown and described, whereby a vessel of pure water is always at hand on board ship for drinking or other purposes.

CONRAD HARTZELL.

Witnesses:
   H. C. HAINES,
   W. H. BELL.